United States Patent [19]

Browne-Wilkinson

[11] Patent Number: 5,672,059

[45] Date of Patent: Sep. 30, 1997

[54] ORTHOPAEDIC HUMAN SKELETAL DEMONSTRATION AIDS

[76] Inventor: Oliver Browne-Wilkinson, 34 Newbrugh Road, London W3 6DQ, England

[21] Appl. No.: 617,169

[22] Filed: Mar. 18, 1996

[30] Foreign Application Priority Data

Mar. 20, 1995 [GB] United Kingdom ............. 9505578
Jan. 18, 1996 [GB] United Kingdom ............. 9601003

[51] Int. Cl.⁶ .................................................. G09B 23/28
[52] U.S. Cl. .................................................. 434/274
[58] Field of Search ................... 434/262, 267, 434/274, 275

[56] References Cited

U.S. PATENT DOCUMENTS

| | | | |
|---|---|---|---|
| 979,147 | 12/1910 | Fryette | 434/274 |
| 983,547 | 2/1911 | Fleck | 424/274 |
| 3,754,338 | 8/1973 | Culver. | |
| 3,762,070 | 10/1973 | Culver. | |
| 4,200,995 | 5/1980 | Trella. | |
| 4,624,642 | 11/1986 | Ferrara. | |

FOREIGN PATENT DOCUMENTS

| | | | |
|---|---|---|---|
| 605262 | 10/1934 | Germany | 434/274 |
| 2232522 | 12/1990 | United Kingdom | 434/274 |

*Primary Examiner*—Jeffrey A. Smith
*Attorney, Agent, or Firm*—Young & Thompson

[57] ABSTRACT

An orthopaedic human skeletal demonstration aid for demonstrating surgical orthopaedic techniques consists of a facsimile of at least part of a human vertebral column including a plurality of vertebral elements simulating the external appearance of human vertebrae, and a plurality of intervertebral disk elements disposed intermediate the vertebral elements. The vertebral elements and the intervertebral disk elements are provided with central apertures and are releasably secured together by an externally screwthreaded flexible rod extending through apertures and provided with nuts at its ends for securely clamping the elements together. Such an aid is capable of being flexed to simulate anatomical distortions of the human spine, and can be used for demonstrating a wide range of replacement or repair techniques, including fitting of a surgical implant.

14 Claims, 1 Drawing Sheet

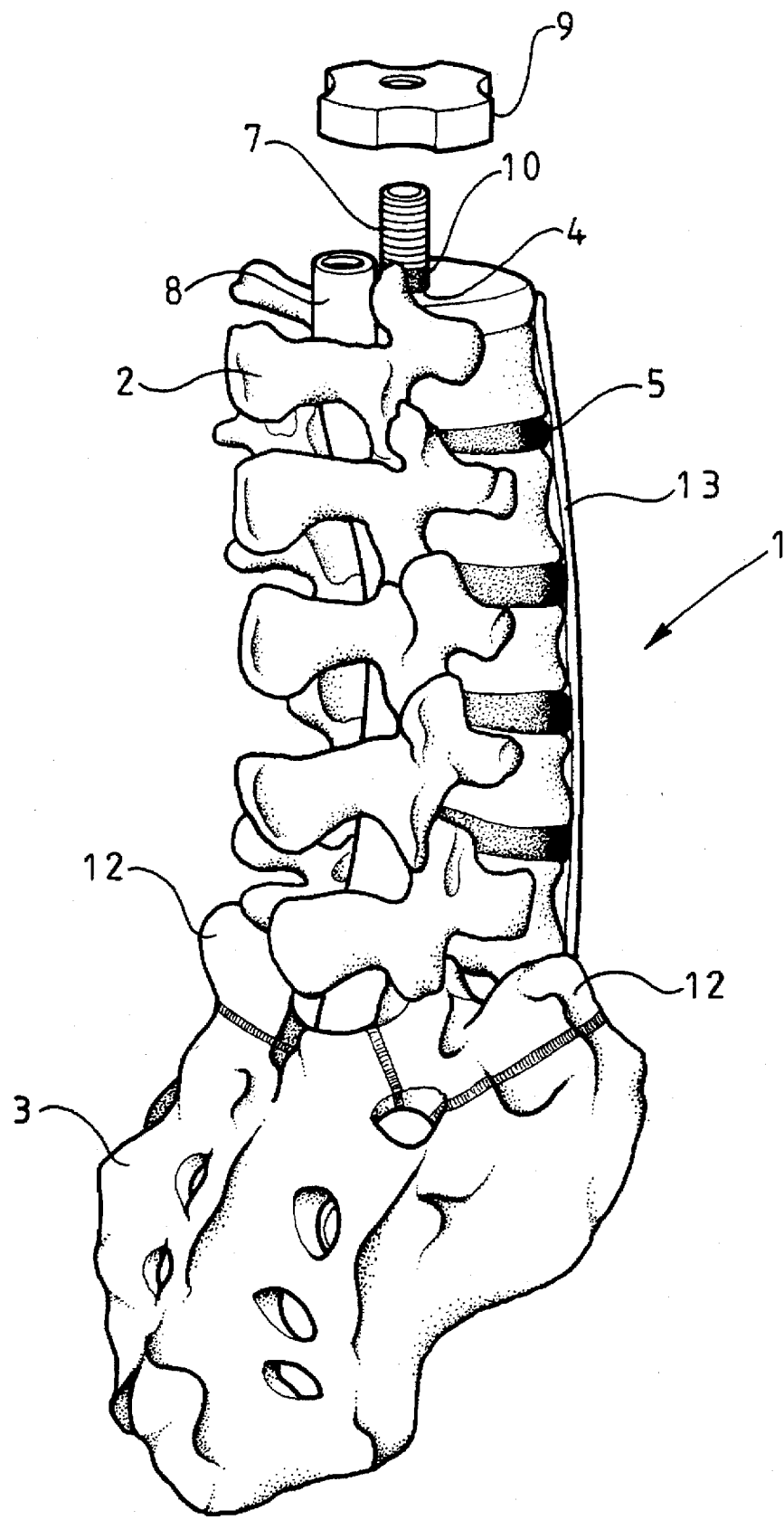

ORTHOPAEDIC HUMAN SKELETAL DEMONSTRATION AIDS

This invention relates to orthopaedic human skeletal demonstration aids.

In the medical field, it is known to demonstrate surgical techniques using aids specifically provided for this purpose, since it is impractical to rely solely on demonstration of such techniques on the human body. To this end there is a need for an orthopaedic demonstration aid which is capable of simulating anatomical distortions of the human spinal column due to accident or disease so as to be capable of demonstrating various surgical techniques, including the fitting of surgical implants.

It is an object of the invention to provide an orthopaedic human skeletal demonstration aid which is capable of demonstrating surgical orthopaedic techniques in relation to the human spine.

According to the present invention there is provided an orthopaedic human skeletal demonstration aid for demonstrating surgical orthopaedic techniques, the aid consisting of a facsimile of at least part of a human vertebral column including a plurality of vertebral elements simulating the external appearance of human vertebrae, and a plurality of intervertebral disk elements disposed intermediate the vertebral elements, the vertebral elements and the intervertebral disk elements being provided with central apertures and being releasably secured together by an elongate flexible element extending through the apertures.

Such a demonstration aid is particularly convenient in use in that it reproduces the natural anatomical form of the human spine, and can be flexed to simulate a plurality of anatomical distortions that occur in the human spine, for the purpose of demonstrating a wide range of replacement or repair techniques, including fixing of a surgical implant. Furthermore the aid is capable of showing all stages of joint replacement in one demonstration aid.

In order that the invention may be more fully understood, reference will now be made, by way of example, to the accompanying drawing in which the single FIGURE shows a perspective view of a preferred demonstration aid in accordance with the invention.

The illustrated demonstration aid 1 in the form of a facsimile of the lower part of a human vertebral column comprises five vertebral elements 2 and a sacrum 3 (which is a further vertebral element) which are individually moulded from a synthetic material which is capable of replicating the fine structure of the bone surface in a per se known manner so that the vertebral elements 2, 3 correctly reproduce the actual external appearance of the lower part of the human vertebral column when put together in the correct order. The vertebral elements 2 and 3 are provided with central apertures 4 and are spaced apart by a plurality of intervertebral disk elements 5 also provided with central apertures (not visible in the figures). The intervertebral disk elements 5 are moulded from silicone rubber or polyurethane foam so that their opposing surfaces conform to the abutting surfaces of the vertebral elements 2, 3 so that all the elements 2, 3 and 5 fit together snugly in the manner of actual human vertebrae.

The elements 2, 3 and 5 are held together by an externally screwthreaded flexible rod 7 made of copper which is surrounded by a flexible sleeve 10 made of plastics material and which passes through the central apertures in the elements with an internally screwthreaded nut 9 being provided on each end of the rod 7 in order to securely clamp the elements together. Optionally the abutting surfaces of the elements 2, 3 and 5 are provided with interconnecting means, such as Velcro brand hook and loop strips, for connecting the elements together (Velcro is a Registered TradeMark). Furthermore the elements 2 and 3 may be provided with connection means, such as further hook and loop pads, on their external surfaces for detachable connection thereto of a facsimile ligament 13 which may be the hook and loop strip A facsimile spinal cord 8 may also be attached to the elements 2 and 3 by similar connection means.

The flexible sleeve 10 has an external diameter substantially corresponding to the internal diameter of the central apertures so that, when the aid is fully assembled, the sleeve 10 ensures that the elements 2, 3 and 5 are held on the rod 7 without substantial movement therebetween. Furthermore the rod 7 may be pre-formed so as to be slightly curved along its length so that the assembled aid simulates long axial deformity of the human spine, whilst allowing sufficient flexibility of the aid to enable it to be substantially straightened to simulate a straightened human spine. The rod 7 permits such flexing without leading to fracturing of the rod 7 in use.

It will be appreciated that a range of surgical techniques may be practiced on such an aid, including cutting into the simulated vertebrae and fitting of a surgical implant. Furthermore, if one or more the vertebral elements 2, 3 has been cut during a particular demonstration, the aid may be subsequently dismantled by release of the nuts 9 and sliding of the elements 2, 3 and 5 along the rod 7 so that the damaged vertebral elements may be replaced by fresh vertebral elements. If required the sacrum 3 may have detachable parts 12, secured in position by hook and loop pads for example, which can be replaced when damaged in use. Each of the intervertebral disk elements 5 may be provided with a slit extending between its central aperture and outer surface and enabling the intervertebral disk element 5 to be pulled off the rod 7 from the side if required so that each such element can be removed from between a pair of vertebral elements 2, 3 without first having to remove the vertebral elements 2, 3 from the rod 7.

I claim:

1. An orthopaedic human skeletal demonstration aid for demonstrating surgical orthopaedic techniques, the aid consisting of a facsimile of at least part of a human vertebral column including a plurality of vertebral elements simulating the external appearance of human vertebrae, and a plurality of intervertebral disk elements disposed intermediate the vertebral elements, the vertebral elements and intervertebral disk elements being provided with central apertures and being releasably secured together by an elongate flexible element extending through the apertures, wherein said aid may be flexed without returning to an original shape.

2. An aid according to claim 1, wherein the elongate flexible element is a rod provided at least one end with a detachable clamping member.

3. An aid according to claim 2, wherein the or each clamping member is an internally screwthreaded nut.

4. An aid according to claim 1, wherein the elongate flexible element is screwthreaded along its length.

5. An aid according to claim 1, wherein the elongate flexible element is made of a metallic material.

6. An aid according to claim 1, wherein the elongate flexible element is slightly curved along its length.

7. An aid according to claim 1, wherein the elongate flexible element is surrounded by a flexible sleeve having an external diameter substantially corresponding to the internal diameter of the central apertures.

8. An aid according to claim 1, wherein the intervertebral disk elements are provided with slits to enable them to be removed from the elongate flexible element from the side.

9. An aid according to claim 1, wherein the intervertebral disk elements are made of a material selected from the group consisting of rubber and a foamed plastics material.

10. An aid according to claim 1, wherein the intervertebral disk elements are moulded so as to have surfaces which conform to the abutting surfaces of the vertebral elements.

11. An aid according to claim 1, wherein the vertebral elements and the intervertebral disk elements are provided with releasable interconnecting means, for releasably connecting the elements together.

12. An aid according to claim 1, wherein at least one facsimile ligament is attached to the vertebral elements.

13. An aid according to claim 1, wherein the vertebral elements are provided with connection means, for detachable connection of at least one facsimile ligament thereto.

14. An aid according to claim 1, wherein the lowermost vertebral element is a facsimile sacrum.

* * * * *